(12) United States Patent
Kratochvil et al.

(10) Patent No.: US 12,476,466 B2
(45) Date of Patent: Nov. 18, 2025

(54) DEVICE AND METHOD FOR CONVERTING ELECTRICAL ENERGY (71) Applicant: SMA Solar Technology AG, Niestetal (DE)

(72) Inventors: Marcel Kratochvil, Kassel (DE); Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 18/743,411

(22) Filed: Jun. 14, 2024

(65) Prior Publication Data

US 2024/0332981 A1    Oct. 3, 2024

Related U.S. Application Data

(63) Continuation of application No. PCT/EP2022/086399, filed on Dec. 16, 2022.

(30) Foreign Application Priority Data

Dec. 17, 2021    (DE) ..................... 10 2021 133 700.3

(51) Int. Cl.
*H02J 3/38*      (2006.01)
*H02J 15/00*     (2006.01)

(52) U.S. Cl.
CPC ............ *H02J 3/381* (2013.01); *H02J 15/008* (2020.01); *H02J 2300/24* (2020.01)

(58) Field of Classification Search
CPC .... H02J 3/38; H02J 3/381; H02J 15/00; H02J 15/008; H02J 2300/24
See application file for complete search history.

(56) References Cited

U.S. PATENT DOCUMENTS

| 4,341,607 A | 7/1982 | Tison |
| 6,031,737 A | 2/2000 | Green |

(Continued)

FOREIGN PATENT DOCUMENTS

| CN | 113036811 A | 6/2021 |
| CN | 113279001 A | 8/2021 |

(Continued)

OTHER PUBLICATIONS

International Search Report dated Feb. 24, 2023, for International Application No. PCT/EP2022/086399.

(Continued)

*Primary Examiner* — Robert L Deberadinis
(74) *Attorney, Agent, or Firm* — Eschweiler & Potashnik, LLC (57) ABSTRACT

A device for converting electrical power between a PV generator and an electrolyzer. The device has an inverter arranged between a first side thereof and a transformer, and an active rectifier is arranged between the transformer and a second side of the device, such that an AC side of the active rectifier and an AC side of the inverter are connected to one another via the transformer. The inverter is configured to convert a first DC voltage on the DC side of the inverter into a first AC voltage on the AC side of the inverter and the active rectifier is configured designed to convert a second AC voltage on the AC side of the active rectifier into a second DC voltage on the DC side of the active rectifier. The device has a controller configured to influence a power flow between the first side and the second side of the device from a connected PV generator to a connected electrolyzer by adjusting an AC/DC transformation ratio of the active rectifier between the second AC voltage and the second DC voltage.

20 Claims, 9 Drawing Sheets

(56) References Cited

U.S. PATENT DOCUMENTS

2011/0040421 A1    2/2011   Duret et al.
2019/0067945 A1    2/2019   Hierl et al.

FOREIGN PATENT DOCUMENTS

DE      3150758 A1     7/1983
DE     69628657 T2     4/2004
EP      3361617 A1     8/2018
EP      3691081 A1     8/2020

OTHER PUBLICATIONS

K.W. Harrison et al. "The Wind-to-Hydrogen Project: Operational Experience, Performance Testing, and Systems Integration." Technical Report NREL/TP-500-44082. Retrieved from the Internet: http://www.nrel.gov/docs/fy09osti/44082.pdf. Published Mar. 1, 2009.

DEVICE AND METHOD FOR CONVERTING ELECTRICAL ENERGY

REFERENCE TO RELATED APPLICATIONS

This Application is a Continuation of International Application number PCT/EP2022/086399, filed on Dec. 16, 2022, which claims the benefit of German Application number 10 2021 133 700.3, filed on Dec. 17, 2021. The contents of the above-referenced Patent Applications are hereby incorporated by reference in their entirety.

FIELD

The application relates to a device and a method for converting electrical power, which is taken, for example, from a PV generator and fed to an electrolyzer.

BACKGROUND

A PV generator (PV: photovoltaics) has a PV characteristic curve that shows the dependence of the current generated by the PV generator on the voltage applied to the PV generator. When operating a PV generator at a power converter, for example, at an inverter, the power converter can specify the voltage on the PV generator and vary it over a relatively wide voltage range. The PV characteristic curve has a maximum power point, i.e. a voltage at which the product of current and voltage is maximum. The maximum power is also referred to as MPP power (MPP: Maximum Power Point). Usually, the power converter comprises a control system which endeavors to set the maximum power point by suitably varying the voltage and observing the corresponding change in power. In particular, a measurement of the current as a function of the set voltage can be used for this purpose.

An electrolyzer has an electrolysis characteristic curve that represents the dependence of the current drawn by the electrolyzer on the voltage applied to the electrolyzer. When operating an electrolyzer at a power converter, for example, at an active rectifier, the power converter can specify the voltage at the electrolyzer and vary it over a voltage range. The electrolysis characteristic curve of the current has an idle range and a starting voltage, wherein the electrolyzer is in idle mode below the starting voltage and can be operated in an electrolysis operating mode above the starting voltage. The starting voltage corresponds to the so-called decomposition voltage of the individual electrolysis cells of the electrolyzer. In the electrolysis operating mode, the current consumed by the electrolyzer and thus the power consumed increases monotonically with increasing voltage at the electrolyzer up to the maximum power of the electrolyzer.

DE3150758A1 describes a device that feeds the electrical energy generated by a PV generator to an electrolyzer via a switching mechanism. In order to improve the adaptation of the PV generator to the electrolyzer under different operating conditions, the switching mechanism feeds a part of the electrical energy generated by the PV generator to a battery or feeds electrical energy to the electrolyzer, part of which is taken from the battery, depending on the operating conditions.

SUMMARY

The application is directed to an improved device for converting electrical power, which is configured to draw electrical power from a PV generator and feed it to an electrolyzer. The disclosure is also directed to a method for converting electrical power, in which the electrical power is drawn from a PV generator and fed to an electrolyzer.

A device is provided for converting electrical power between a PV generator and an electrolyzer, wherein the device has a first side for connecting a PV generator and a second side for connecting an electrolyzer. The device has an inverter and an active rectifier. The inverter is located between the first side of the device and a transformer. The active rectifier is located between the transformer and the second side of the device. This means that an AC side of the rectifier is connected to an AC side of the inverter via the transformer.

The inverter is configured to convert a first DC voltage on the DC side of the inverter into a first AC voltage on the AC side of the inverter. In one embodiment, the first DC voltage can correspond to a PV voltage of a connected PV generator. The rectifier is configured to convert a second AC voltage on the AC side of the rectifier into a second DC voltage on the DC side of the rectifier. In one embodiment, the second DC voltage can correspond to an electrolysis voltage of a connected electrolyzer.

The device comprises a controller which is configured to influence a power flow between the first side and the second side of the device from a connected PV generator to a connected electrolyzer by adjusting an AC/DC transformation ratio of the rectifier between the second AC voltage and the second DC voltage. The AC/DC transformation ratio in one embodiment corresponds to the quotient of the second AC voltage on the AC side of the rectifier and the second DC voltage on the DC side of the rectifier. Depending on the specific definition of the transformation ratio to be used, this quotient can be formed from various parameters of the DC voltage and the AC voltage, where, for example, a maximum amplitude or an effective value of the relevant voltage can be used. By adjusting the AC/DC transformation ratio, the flow of electrical power between the PV generator and electrolyzer can be adjusted so that the power converted by the device can be adapted, for example, to the prevailing operating conditions of the PV generator and electrolyzer. For example, the power flow can be dynamically adapted to the operating conditions. This can include, for example, setting the AC/DC transformation ratio to achieve a power flow that corresponds to an optimum point on the respective characteristic curves of the electrolyzer and/or the PV generator, for example, an operating point of maximum power of the PV generator. The adjustment can be carried out step by step and/or successively. In one embodiment, the controller of the device is arranged in the active rectifier.

In one embodiment, the active rectifier has semiconductor switches which are realized, for example, in a bridge configuration and form an active rectifier bridge. In this embodiment, the AC/DC transformation ratio of the active rectifier is set by suitable clocking of the semiconductor switches. The clocking is achieved by a clocked controlling of the semiconductor switches. The clocked controlling can be carried out, for example, by the controller of the device or by the controller of the active rectifier. The relationship between the second DC voltage and the second AC voltage depends on the AC/DC transformation ratio of the active rectifier. In one embodiment, the DC voltage can substantially correspond to the maximum amplitude of the AC voltage if the transformation ratio has the value one, for example, if the semiconductor switches are not clocked.

In one embodiment of the device, the first DC voltage on the DC side of the inverter and the second DC voltage on the DC side of the active rectifier depend on the AC/DC transformation ratio of the active rectifier. In this embodiment, the power flow between the first and second sides of the device is therefore influenced by adjusting the first and second DC voltages via the AC/DC transformation ratio of the rectifier. In one embodiment, the first DC voltage and the second DC voltage can be set at a given AC/DC transformation ratio such that the operating points on the characteristic curves of a connected PV generator and a connected electrolyzer have substantially the same power with opposite signs, wherein their DC voltages are spaced apart from each other according to the AC/DC transformation ratio.

In one embodiment, the active rectifier can act as a buck converter from its DC side to its AC side depending on the AC/DC transformation ratio. The second AC voltage, or more precisely the phase-to-phase voltage of the second AC voltage on the AC side of the rectifier, is calculated by multiplying the second DC voltage by the AC/DC transformation ratio. With the active rectifier, which acts as a buck converter, the AC/DC transformation ratio is therefore less than or at most equal to 1. This allows the power flow to be even better adjusted and the operating point to be optimized on the respective characteristic curves. Alternatively or additionally, the inverter can act as a buck converter with a DC/AC transformation ratio from its DC side to its AC side. The DC/AC transformation ratio corresponds to the quotient of the first DC voltage on the DC side of the inverter and the first AC voltage on the AC side of the inverter. The first AC voltage, or more precisely the phase-to-phase voltage of the first AC voltage, is calculated here by multiplying the first DC voltage by the DC/AC transformation ratio. The DC/AC ratio of the inverter, which acts as a buck converter, is therefore greater than or at least equal to 1. This allows the power flow to be even better adjusted and the operating point to be optimized on the respective characteristic curves.

In one embodiment of the device, the transformer converts the first AC voltage to the second AC voltage with an AC/AC transformation ratio and realizes a galvanic separation between the first side and the second side of the device. In one embodiment the AC/AC transformation ratio corresponds to the quotient of the first AC voltage on one side of the transformer and the second AC voltage on another side of the transformer. The first AC voltage, which is present on the AC side of the inverter, is thus coupled, for example, with the second AC voltage, which is present on the AC side of the rectifier, in that the transformer converts the first AC voltage to the second AC voltage with the AC/AC transformation ratio. This means that the first DC voltage on the DC side of the inverter can also depend on the second AC voltage via the first AC voltage and the transformer, and can be coupled to the second DC voltage via the current transformation ratio of the active rectifier.

In one embodiment, the device is configured to influence the power flow between its first side and its second side by adjusting the DC/AC transformation ratio of the inverter and/or the AC/AC transformation ratio of the transformer. This influence is therefore in addition to the influence via the AC/DC transformation ratio of the rectifier. This results in further degrees of freedom for the design of the energy conversion system, for example, for the dimensioning of connectable PV generators and electrolyzers, wherein an optimization of the power flow can be achieved in each case through a system design and dynamic adaptation of transformation ratios without the hardware of the device having to be modified.

In one embodiment of the device, the inverter is configured such that it can perform the function of the active rectifier when suitably controlled, and vice versa, such that the active rectifier can perform the function of the inverter. In one embodiment, the inverter and the active rectifier have the same or similar housing and, for example, the same or similar power electronics circuit. In one embodiment, the active rectifier and the inverter can have the same hardware equipment, differing only in the controlling of the semiconductor switches, which defines the function "active rectifier" or "inverter." This has the advantage that existing hardware can be used flexibly for different purposes.

In one embodiment, the inverter is connected to the transformer via an AC grid and at least one further inverter is connected to the AC grid, wherein the further inverter can be connected on its DC side to a further PV generator or an electrical energy store. Such an AC grid, which is locally limited and not connected to a power supply grid, makes it possible to feed electrical energy that is generated or stored by other DC units, e.g. other PV generators or batteries, into the electrolyzer.

A method for converting electrical power between a PV generator and an electrolyzer comprises:

Converting a PV power generated by the PV generator at a first DC voltage into an AC power at a first AC voltage by an inverter.

Transforming the AC power through a transformer into an AC power with a second AC voltage. and Converting the AC power into DC power by an active rectifier.

The DC power is fed into the electrolyzer at a second DC voltage. The power flow between the PV generator and the electrolyzer is influenced by the active rectifier by setting an AC/DC transformation ratio between the second AC voltage and the second AC voltage. The method can be carried out for example on one of the devices described above. The adjustment by the active rectifier can be controlled by a controller, which can be located e.g. in the active rectifier.

In one embodiment of the method, the first DC voltage is present at a DC side of the inverter and thus at the connected PV generator. The first AC voltage is present at the transformer on an AC side of the inverter. The second AC voltage is present at an AC side of the active rectifier. The second DC voltage is present at a DC side of the rectifier at the electrolyzer. Both the first DC voltage and the second DC voltage depend on the set AC/DC transformation ratio of the active rectifier.

In one embodiment of the method, the power flow is increased, starting from a first DC voltage, which corresponds to an open-circuit voltage of the PV generator, and a second DC voltage, which corresponds to a standby voltage of the electrolyzer, in that the AC/DC transformation ratio of the active rectifier is set such that the first DC voltage is reduced and the second DC voltage is increased, wherein the PV power increases in the direction of an MPP power and the DC power absorbed by the electrolyzer increases in the direction of a nominal power along an electrolysis characteristic curve of the electrolyzer. This simultaneously shifts the respective operating point on the characteristic curves of the electrolyzer and PV generator in the direction of higher power, wherein the output from the respective operating points is largely identical.

In one embodiment of the method, the AC/DC transformation ratio of the active rectifier is set to an initial state such that the first DC voltage corresponds to an open-circuit voltage of the PV generator and the second DC voltage corresponds to a standby voltage of the electrolyzer. The open-circuit voltage of the PV generator is a given value at a point in time, while the standby voltage of the electrolyzer can be within a voltage range below a starting voltage. In the initial state, the ratio of the first DC voltage to the second DC voltage can essentially correspond to the product of the AC-AC transformation ratio of the transformer and a fixed DC/AC transformation ratio of the inverter.

In one embodiment of the method, the DC/AC transformation ratio of the inverter is set to a value between 1 and 2, or to a value between 1.3 and 1.7, e.g. 1.5. In one embodiment, this value is advantageous for adjusting the initial state of the device and the method so that the power flow between the first and second side of the device can be optimized and suitable operating points on the characteristic curves of the PV generator and electrolyzer can be achieved. In addition, the selection of a specific value for the DC/AC transformation ratio allows greater freedom in the selection of the PV generators and electrolyzers that can be connected, and the method can be optimally adjusted to the range of foreseeable changes in the characteristic curves during operation, for example, weather- and irradiation-related shifts in the PV characteristic curve of the PV generator.

In one embodiment of the method, the AC/AC transformation ratio of the transformer can be changed stepwise to reach an initial state in which the DC/AC transformation ratio of the inverter has the value determined therefor and the AC/DC transformation ratio of the rectifier has substantially the value one. This state is advantageous for adjusting the initial state of the device and the method so that the power flow between the first and second side of the device can be optimized and, for example, suitable operating points can be achieved on the characteristic curves of the PV generator and electrolyzer. In addition, the selection of the AC/AC transformation ratio and its range of variation can be used as a degree of freedom for the design of the overall system and optimized for the specific relative position of the characteristic curves of the PV generator and electrolyzer.

The DC/AC transformation ratio and the AC/AC transformation ratio can be changed once or repeatedly, for example, daily at the start of the energy supply system in the morning and/or several times a day in response to changes in the characteristic curves, for example, to shifts in the PV characteristic curve of the PV generator due to weather and irradiation.

In one embodiment of the method, the AC/DC transformation ratio of the rectifier is adjusted by varying a duty cycle of the active rectifier depending on a detected power of the power flow from the PV generator into the electrolyzer. The AC/DC transformation ratio, i.e. the transformation ratio of the active rectifier, depends here on the degree of modulation of the active rectifier, for example, the degree of modulation of the semiconductor switches of the active rectifier.

In one embodiment of the method, the AC/DC transformation ratio of the rectifier is changed stepwise such that the power output of the PV generator, i.e. the PV power, is increased stepwise, wherein the power output is increased from the initial state or from zero to a maximum power of the PV generator. Starting from the open-circuit operation of the PV generator, this corresponds to a reduction in the first DC voltage, which corresponds to the PV voltage, from the open-circuit voltage of the PV generator along the PV characteristic curve in the direction of higher power. The PV power can flow, as part of the power flow of electrical energy, from the PV generator to the electrolyzer.

In one embodiment of the method, the AC/DC transformation ratio of the rectifier is repeatedly changed and the resulting change in the power flow is observed. The AC/DC transformation ratio of the rectifier is adjusted after each change so that the PV power of the PV generator approaches the MPP power. This can correspond to an MPP tracking control, for example. In this embodiment, the active rectifier therefore carries out the MPP tracking of the PV generator.

In one embodiment of the method, the device has a further inverter which is connected on its DC side to an electrical energy store and on its AC side to the transformer, wherein the further inverter exchanges an adjustable DC storage power with the energy store.

An energy conversion system may comprise a PV generator, an electrolyzer, and one or more of the devices described above for converting electrical power. Such an energy conversion system can be set up to carry out one or more of the methods described above.

BRIEF DESCRIPTION OF THE FIGURES

The disclosure is further explained and described below with reference to example embodiments illustrated in the figures.

DETAILED DESCRIPTION

Figure 1:
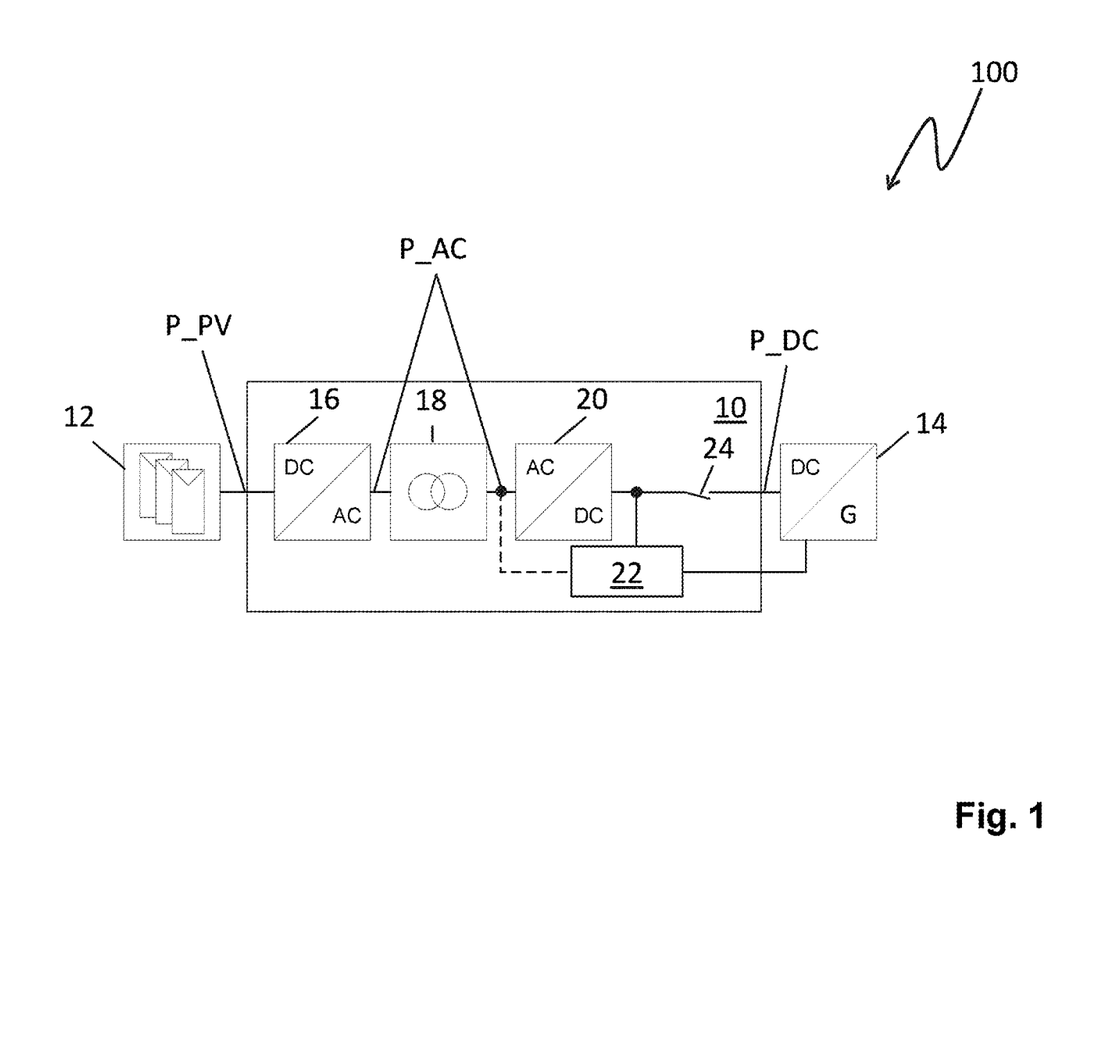
FIG. 1 shows, by way of example, an energy conversion system with an embodiment of a device for converting electrical power.

FIG. 1 schematically shows an energy conversion system 100 with a device 10 for converting electrical power. A PV generator 12 is connected to an electrolyzer 14 via the device 10. The device 10 comprises an inverter 16, a transformer 18, and an active rectifier 20. In one embodiment the inverter 16 and the rectifier 20 are identical in terms of their essential properties, e.g., they have the same or similar housing and the same or similar power electronics circuit. The available PV power P_PV of the PV generator 12 is converted in the device 10 and is available as electrolysis power P_P2G directly for use in the electrolyzer 14, for example, for hydrogen production.

In one embodiment, if sufficient PV power P_PV is available from the PV generator 12 to start the system, a first AC voltage U_AC1 with a setpoint value in a range from e.g. 350 to 690 V and with a frequency of e.g. 50 Hz or 60 Hz or, if required, a different frequency between e.g. 20 Hz and 100 Hz can be generated via the inverter 16 and applied to one side of the transformer 18. As a result, the transformer 18 is pre-magnetized, wherein in order to build up the pre-magnetization it can be advantageous to increase the amplitude of the first AC voltage U_AC1 generated by the inverter to the setpoint value via a ramp.

The inverter 16 is configured to step down the first DC voltage U_PV applied to the DC side, which substantially corresponds to the PV voltage P_PV, from the DC to the AC side with a DC/AC transformation ratio, so that the first DC voltage U_PV (and thus the PV voltage P_PV) is above the amplitude of the first AC voltage U_AC1 generated by the phase-to-phase voltage.

The second AC voltage U_AC2, which is applied to the AC side of the active rectifier 20, results from the first AC voltage on the AC side of the inverter 18 divided by the AC/AC transformation ratio of the transformer 18. If the AC/AC ratio of the transformer 18 is e.g. 1.5, then the second AC voltage U_AC2 is transformed to ⅔ of the value of the first AC voltage U_AC1. The second AC voltage U_AC2 on the AC side of the active rectifier 20 is for example 350 V to 690 V and is, for example, not set to a fixed value during operation, but can vary depending on the set AC/DC transformation ratio of the rectifier 20 or the desired power flow.

Figure 2:
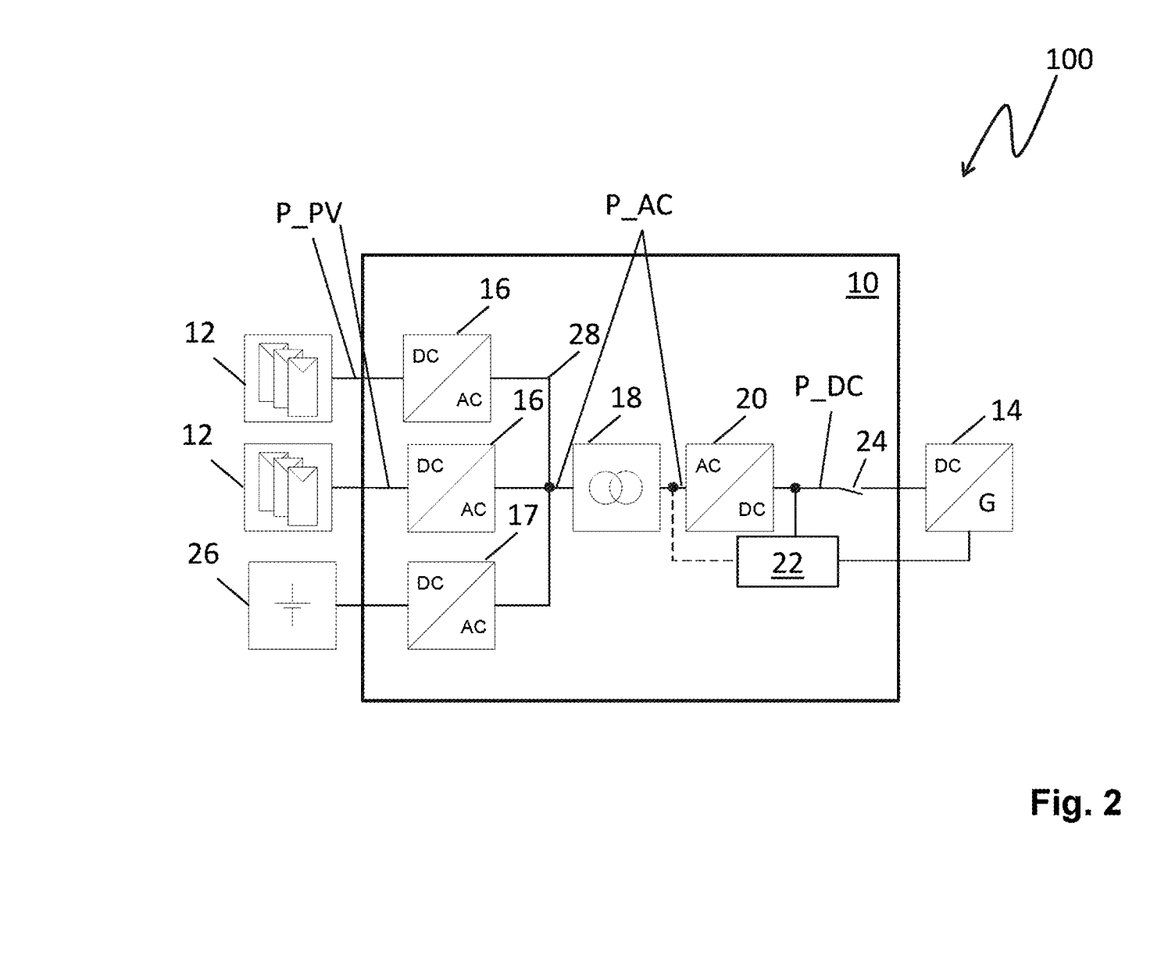
FIG. 2 shows, by way of example, an energy conversion system with an embodiment of a device for converting electrical power.

FIG. 2 shows possible extensions of the energy conversion system 100. By connecting an energy store 26 via a bidirectional inverter 17 to the transformer 18, any surplus PV power P_PV can be stored and the electrolysis operating mode can be supported or maintained in times of low PV power P_PV by drawing energy from the store 26. Furthermore, more than one PV generator 12 can be connected to the transformer 18. A plurality of PV generators 12 can each be connected via their own inverter 16. If the PV generators 12 have different characteristic curves, for example, due to different string lengths, and are therefore optimally operated at different PV voltages U_PV, the DC/AC transformation ratios of the inverters 16 can be adjusted accordingly so that the inverters generate the same first AC voltage U:AC. The PV generators 12 and the store 26 can be connected to the transformer 18 via a local AC grid 28, which, for example, is not connected to a public grid.

It is also possible in one embodiment to ground the electrolyzer 14 or the PV generators 12 or the store 26 (store 26 and PV generator 12 are at the same potential to ground). The PV generator 12 and possibly the store 26 are electrically isolated from the electrolyzer 14 by the transformer 18.

Figure 3A:
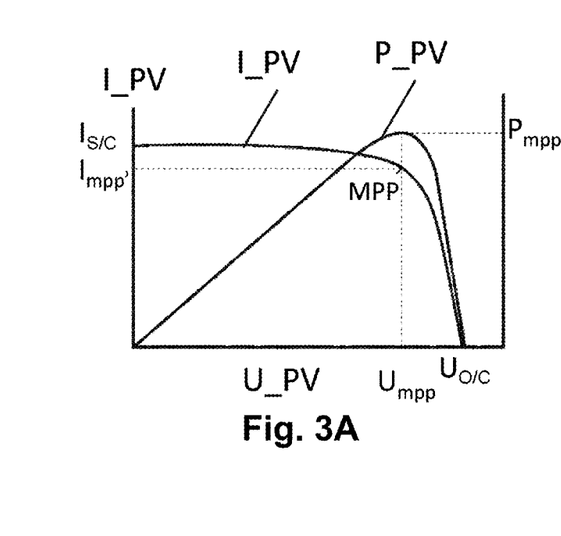
FIGS. 3A and 3B show example characteristic curves of a PV generator and an electrolyzer.
Figure 3B:
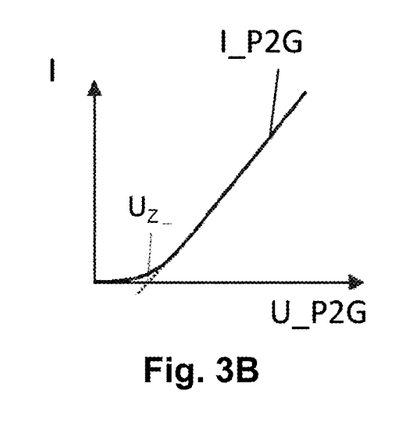

FIGS. 3a and 3b show example characteristic curves of a PV generator 12 and an electrolyzer 14. The PV characteristic curve in FIG. 3a shows the dependence of the current I_PV generated by the PV generator 12, the first DC current, on the voltage U_PV applied to the PV generator 12 under given external conditions (temperature, irradiation, etc.). The PV characteristic curve of the PV power P_PV has a maximum power point $M_{MPP}$, i.e. a voltage at which the product of current and voltage is maximum. The maximum PV power P_PV is also referred to as MPP power. In order to make the best possible use of the irradiated solar energy, the PV generator 12 is therefore controlled by a controller that strives to set the maximum power point by suitably varying the PV voltage U_PV and observing the corresponding change in the PV power P_PV. A measurement of the PV current I_PV as a function of the set PV voltage U_PV can be used for this purpose. In one embodiment, this controller is arranged in the device 10 for power conversion. For example, the controller of the device 10 and/or the controller of the active rectifier 20 can also perform this control task.

An electrolyzer 14 has, for example, an electrolysis characteristic curve of the electrolysis current I_P2G as shown in FIG. 3b, which represents the dependence of the electrolysis current I_P2G absorbed by the electrolyzer 14 on the second voltage U_P2G applied to the electrolyzer 14. The electrolysis characteristic curve of the electrolysis current I_P2G has a standby voltage range and a starting voltage Uz, wherein the electrolyzer 14 is in the standby voltage range below the starting voltage Uz and is thus in no-load operating mode, and can be operated in electrolysis operating mode above the starting voltage Vz. A power characteristic curve of the electrolyzer 14 results from the multiplication of electrolysis current and electrolysis voltage U_P2G and exhibits a comparable curve, increasing monotonically with the second DC voltage U_P2G, which largely corresponds to a quadratic function in the case of the shown largely linear electrolysis characteristic curve of the current I_P2G.

In a method for converting electrical power, the active rectifier 20 starts pre-charging its own DC intermediate circuit when the system is started. For this purpose, the active rectifier 20 draws electrical AC power P_AC via the transformer 18, which is pre-magnetized by means of the inverter 12 using PV power. The AC power drawn from the rectifier 20 is taken from the PV generator 12 by the inverter 16 and is initially fed into a capacitor on the DC side of the rectifier 20 as pre-charging power via the transformer 18 and the rectifier 20. Since the rectifier 20 is in one embodiment identical to the inverter 16 in terms of the power electronic circuit and therefore acts as a buck converter from its DC side to its AC side, the second DC voltage U_P2G on the DC side of the rectifier 20 is greater than the amplitude of the second AC voltage U_AC2 on the AC side of the rectifier 20. The rectifier 20 acts as a buck converter in the direction of the second AC voltage U_AC2 with an AC/DC transformation ratio that results from the second AC voltage U_AC2 divided by the second DC voltage U_P2G. For the buck converter described above, the AC/DC transformation ratio is therefore less than 1 according to this definition. In other words, the second AC voltage U_AC2 is converted into the second DC voltage U_P2G via the rectifier 20 operated as a step-up converter, wherein the DC voltage is greater than the amplitude of the second AC voltage U_AC2.

The energy in the capacitance of the rectifier 20 charged with the second DC voltage U_P2G (or optionally the power provided by the transformer 18 at the second AC voltage U_AC2) can be used to provide an optional auxiliary supply 22, which can be used, for example, for the peripheral equipment of an electrolyzer 14 (e.g. pumps, heaters, and the like). Depending on the required voltage from of the auxiliary supply 22 and depending on the voltage source of the auxiliary supply 22, the setting of the auxiliary voltage in the auxiliary supply 22 can be provided via a further inverter or a DC/DC converter from the DC side of the rectifier 20 or via a converter or a rectifier from the AC side of the rectifier 20. The auxiliary supply can therefore optionally have a further inverter or a DC/DC converter as an auxiliary unit, which is connected to the DC side of the active rectifier 20. The auxiliary supply can optionally have an inverter or a rectifier as an auxiliary unit, which is connected to the AC side of the active rectifier 20. The auxiliary supply can include an electrical store to dampen the effects of voltage fluctuations at the output of the active rectifier 20 or of fluctuations in the PV power P_PV on the voltage of the auxiliary supply 22.

As soon as the electrolyzer 14 is also ready to start and can absorb power, the DC-side switch 24 is closed and the method for converting electrical power switches from system start to electrolysis operating mode.

During an electrolysis operating mode of the device 10 in the energy conversion system 100, the rectifier 20 performs the task of setting the second AC voltage U_AC2 with a predetermined frequency and variable amplitude by adjusting the ratio of the second DC voltage U_P2G at the electrolyzer 14 and the second AC voltage U_AC2 at the transformer 18 using a variable clock ratio. In one embodiment this ratio corresponds to the AC/DC transformation ratio.

In the electrolysis operating mode, the inverter 16 converts the first AC voltage U_AC1 applied to its AC side, i.e. the second AC voltage U_AC2 at the rectifier 20, transformed by the transformer 18 using the AC/AC transformation ratio, into a second DC voltage U_PV on its DC side, which is applied to the PV generator 12 in the electrolysis operating mode. In one embodiment the inverter 16 uses a fixed DC/AC transformation ratio, so that the voltage of the PV generator U_PV has a direct functional dependence on the set second AC voltage U_AC2 of the rectifier 20 via the relationship $$U_{PV} = U_{DCWR} = 2 \times ü \times \hat{U}_{AC}$$

(where U_PV=UPV=$U_{DCWR}$, ü is the DC/AC transformation ratio and $\hat{U}_{AC}$ is the amplitude of the second AC voltage). In other words, the inverter 16 generates from the DC voltage U_PV an AC voltage which follows the first AC voltage U_AC1 set by the rectifier 20 and possibly scaled via the transformer 18, and feeds in an electrical current that results from the PV power P_PV at the resulting PV voltage U_PV. The DC/AC transformation ratio, and thus the ratio of U_PV and U_AC1 in the power equilibrium, can be kept constant.

In the electrolysis operating mode, a controller of the device 10 can use power setpoints that specify a power to be consumed by the electrolyzer 14. The active rectifier 20 sets the specified power, e.g. using its controller, by varying the AC/DC transformation ratio between the second AC voltage U_AC2 on the AC side of the active rectifier 20 and the second DC voltage U_P2G at the electrolyzer 14. For a given value of the AC/DC transformation ratio, a power equilibrium is established between the AC input and the DC output of the active rectifier 20, in that the power supplied by the PV generator 12 corresponds to the power consumed by the electrolyzer 14, at least when losses in the overall system are negligible. This results in operating points on the PV characteristic curve P_PV and the electrolysis characteristic curve of the current I_P2G, the voltages of which are in a ratio to each other that corresponds to the overall transformation ratio of the device 10, i.e. the product of the transformation ratios of inverter 16, transformer 18 and rectifier 20. This corresponds to the product of the DC/AC transformation ratio, the AC/AC transformation ratio, and the AC/DC transformation ratio.

In one embodiment, both the PV power P_PV and the electrolysis power P_P2G can be increased in that, by starting from an AC/DC transformation ratio of the rectifier 20 of one, at which, taking into account the AC/AC transformation ratio of the transformer 18, the PV generator 12 is in an open-circuit operating mode and the electrolyzer 14 is at a standby voltage, the AC/DC transformation ratio is changed in such a way that the AC voltages and thus the PV voltage U_PV decreases and the second DC voltage U_P2G and thus the electrolyzer voltage increases. The operating point of the PV generator 12 moves along the PV characteristic curve in the direction of the MPP and the operating point of the electrolyzer 14 moves along the electrolysis characteristic curve of the current I_P2G in the direction of the nominal power. An overall operating point of the device 10 is reached at which the ratio of the second DC voltage U_P2G and the first DC voltage U_PV corresponds to the overall transformation ratio of the device 10, and at the same time the PV power P_PV is equal to the DC power P_P2G. If the required power of the electrolyzer 14 is above the maximum MPP power of the PV generator 12, the control of the active rectifier 20 switches to MPP tracking, in which the variation of the second AC voltage U_AC2 is carried out by the active rectifier 20 in such a way that the maximum possible PV power P_PV is retrieved from the PV generator, at least as long as this power level is within the nominal power range of the electrolyzer 14 and can be processed by the electrolyzer 14 and/or a store 26.

It is also possible to modify the overall transformation ratio of the device 10 and thus the ratio of the second DC voltage U_P2G at the electrolyzer 14 and the first DC voltage U_PV at the PV generator 12 by changing the AC/AC transformation ratio and/or the DC/AC transformation ratio as an alternative to or in addition to the AC/DC transformation ratio. In one embodiment, this is advantageous in order to obtain a ratio of the DC voltages to each other at system start with an AC/DC transformation ratio of the rectifier 20 of one or close to one, at which both the PV generator 12 is in an open-circuit operating mode and the electrolyzer 14 is at a standby voltage. Starting from this initial state, the power flow from the PV generator 12 to the electrolyzer 14 can be initiated and increased by again modifying the AC/DC transformation ratio of the rectifier 20 so that the second DC voltage U_PV and thus the PV voltage decreases and the second DC voltage U_P2G and thus the electrolyzer voltage increases.

Figure 4:
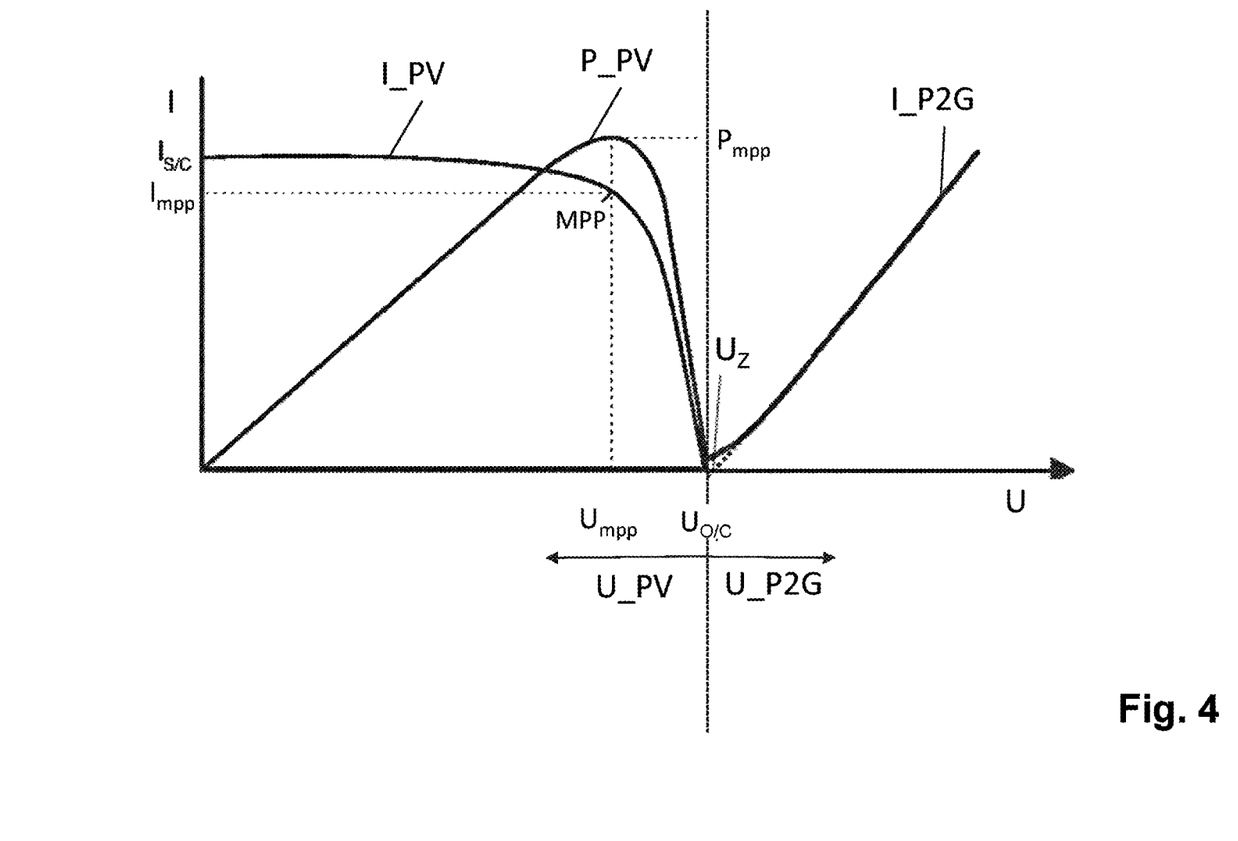
FIG. 4 shows example characteristic curves of a PV generator and an electrolyzer in an energy conversion system over a common x-axis.

The transformer can fundamentally have an AC/AC ratio equal to one. In this embodiment, the characteristic curves of the PV generator 12 and the electrolyzer 14 are configured such that in the starting state they are "next to each other", i.e. with an AC/DC transformation ratio and DC/AC transformation ratio of one or close to one, as shown in FIG. 4, i.e. the starting voltage Uz of the electrolyzer 14 is slightly above the open-circuit voltage $U_O/c$ of the PV generator 12. In an "idle state", i.e. after pre-charging or pre-magnetizing the components with a fixed clocking of the inverter 16, the situation shown in FIG. 4 results, in which the open-circuit voltage $U_{O/C}$ of the PV generator 12, which has influenced the other voltages within the system in the start-up phase, leads to a second DC voltage U_P2G at the electrolyzer 14 which essentially corresponds to the open-circuit voltage $U_{O/C}$ of the PV generator 12, since the components inverter 16, transformer 18, and rectifier 20 located between the PV generator 12 and electrolyzer 14 can each have a transformation ratio of approximately one in the idle state.

Such a design of the energy conversion system 100 may, in one embodiment, require a fairly high voltage range of the electrolyzer 14. For example, the starting voltage of the electrolyzer should be substantially higher than the open-circuit voltage of the PV generator 12. In order to be able to use an electrolyzer 14 with a lower starting voltage, i.e. to shift the position of the electrolyzer characteristic curve in FIG. 4 relative to the PV characteristic curve towards lower voltages, the transformer 18 can have an AC/AC transformation ratio that transforms the first AC voltage U_AC1 on the PV side into a significantly lower second AC voltage U_AC2 on the electrolyzer side. As a result, in FIG. 4—depending on the point of view—the electrolyzer characteristic curve itself can be at significantly lower voltages, for example, an electrolyzer 14 with a lower power level can be used, or the PV characteristic curve can be at significantly higher voltages, i.e. a larger PV generator 12 can be used. The transformer 18 "shifts" the characteristic curves relative to each other based on its AC/AC transformation ratio, so that in the starting state the PV generator 12 is in open-circuit operating mode and also the electrolyzer 14 is at a standby voltage. The basic design of the controlling remains largely unaffected by this, so that the AC/AC transformation ratio of the transformer 18 represents a degree of freedom that can be used in the design of the energy conversion system and/or in the event of changes in the ambient conditions, for example, in the event of changes in irradiation and/or temperature and any resulting changes, for example, to the PV characteristic curve, in order to adapt the operating ranges of PV generator 12 and electrolyzer 14 to one another.

It is therefore possible in one embodiment to shift the electrolysis characteristic curve and the PV characteristic curve very easily by adjusting the AC/AC ratio of the transformer 18. Like PV characteristic curves, electrolysis characteristic curves can be specified in terms of current and/or in terms of power. On the one hand, this can be achieved during the design of the energy conversion system 100 and/or, on the other hand, during operation of the energy conversion system 100 by (dynamically) changing the AC/AC ratio of the transformer 18, for example, via a step switch. Alternatively or additionally, the characteristic curves can be suitably shifted relative to each other, e.g. to compensate for external influences such as irradiation or temperature, by varying the DC/AC transformation ratio of the inverter 16, which is fixed during operation.

Figure 5:
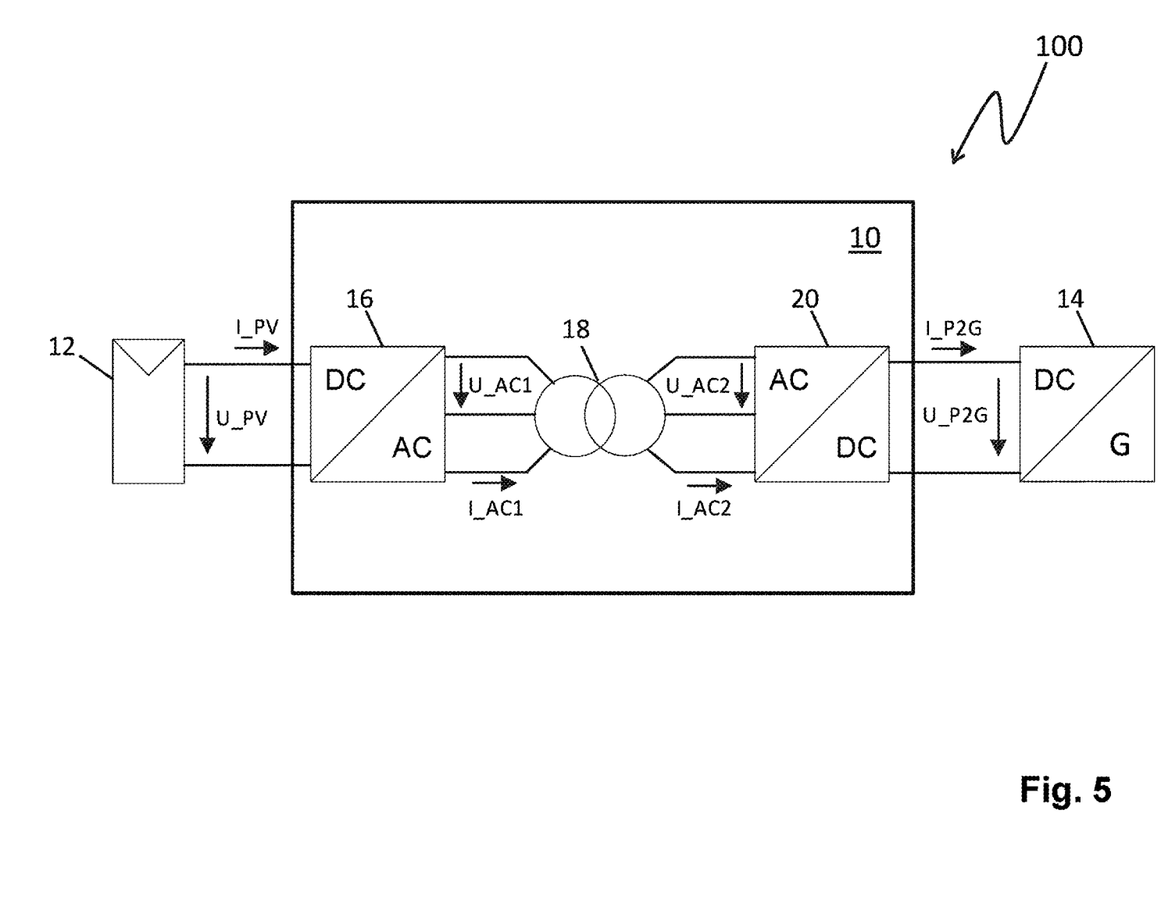
FIG. 5 shows, by way of example, an energy conversion system with an embodiment of a device for converting electrical power.

FIG. 5 shows a specific embodiment of an energy conversion system 100 with an embodiment of the device 10 for converting electrical power and with designation of the various voltages and currents occurring during operation.

The PV generator 12 feeds PV power P_PV into the DC side of the inverter 16 at the first DC voltage U_PV and the PV current I_PV. The inverter 16 converts this PV power P_PV into a first AC power P_AC1. The inverter 16 acts as a buck converter from its DC side to its AC side, i.e. the phase-to-phase voltage of the first AC voltage U_AC1 on its three-phase AC side is lower than the first DC voltage U_PV on its DC side. The DC/AC ratio is used for the bucking.

A transformer 18 with the AC/AC transformation ratio is connected to the AC side of the inverter 16. It transforms the first AC voltage U_AC1 into the second AC voltage U_AC2 and thus converts the first AC power P_AC1 into a second AC power P_AC2. The transformer 18 is supplied by the first AC current I_AC1.

The second AC voltage U_AC2 is applied to the AC side of the active rectifier 20 and the second AC current I_AC2 flows into the rectifier 20 so that the rectifier 20 absorbs the second AC power P_AC2. The rectifier 20 converts the second AC power P_AC2 into a DC power P_P2G. The active rectifier 20 acts as a buck converter from its DC side to its AC side. The active rectifier 20 therefore acts from its AC side to its DC side as a step-up converter with the AC/DC transformation ratio.

On its DC side, the active rectifier 20 feeds the electrolyzer 14 and supplies it with the DC power P_P2G at the second DC voltage U_P2G and with the second DC current I_P2G, wherein the second DC voltage U_P2G and the second DC current are linked via the electrolysis characteristic curve of the electrolyzer 14.

FIG. 6 to FIG. 9 show examples of various characteristic curves and operating points of a design of the energy conversion system 100 with the device 10 according to FIG. 5.

Figure 6:
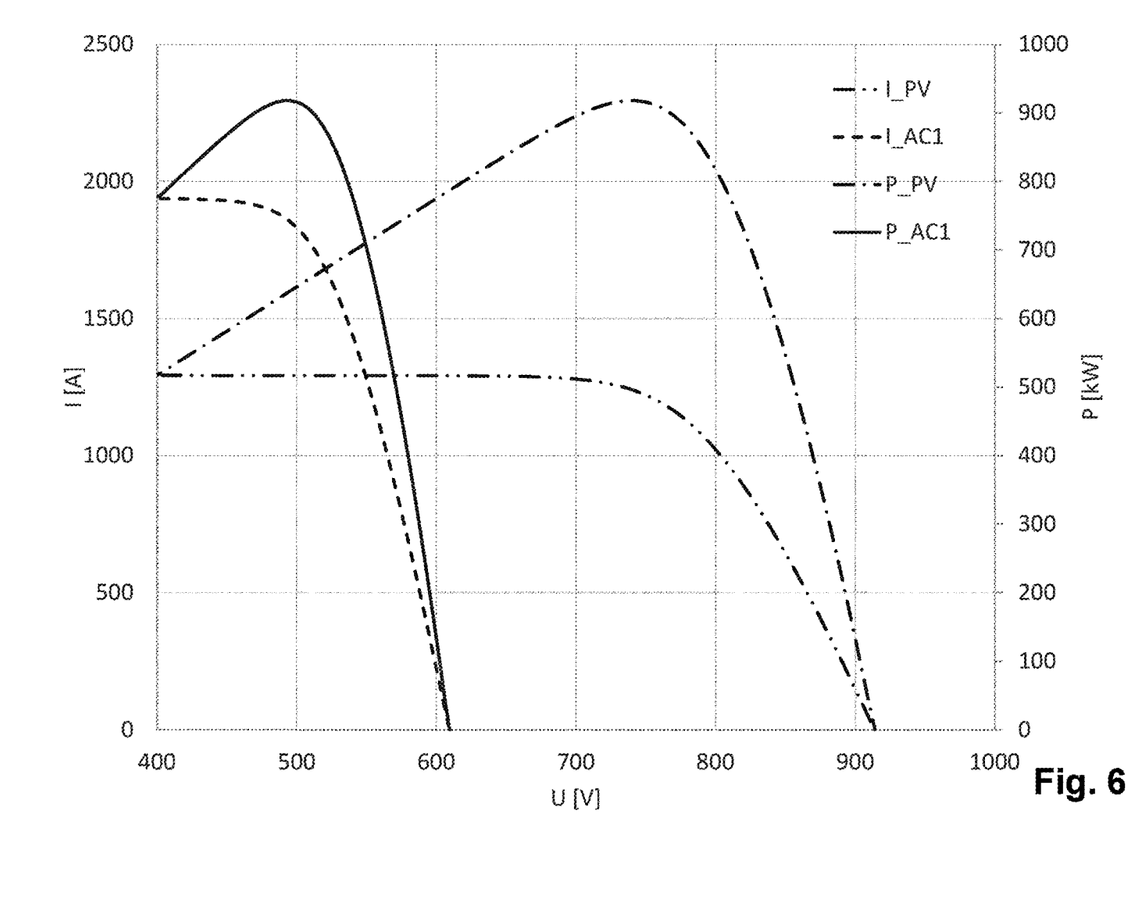
FIG. 6-9 show characteristic curves for an example design of the device for converting electrical power.

FIG. 6 shows the behavior of a PV generator 12 as a function of the voltage, wherein a distinction is made between current and power on the one hand and between DC and AC on the other. In FIG. 6, the characteristic curve shown in a dash-dotted line represents the PV power P_PV over the first DC voltage U_PV for an example of a PV generator 12. The characteristic curve shown with a dash-double-dotted line represents the first DC current I_PV over the first DC voltage U_PV for the same PV generator 12. The solid-line characteristic curve represents the first AC power P_AC1 over the first AC voltage U_AC1 on the AC side of the inverter 16. The dashed characteristic curve represents the first AC current I_AC1 over the first AC voltage U_AC1. The total current I_AC1 is plotted in all three conductors for phase-to-phase voltages U_AC1. The DC/AC transformation ratio in the example shown is U_PV/U_AC1=1.5. In this example, the amplitude of the first DC voltage U_PV of the inverter 16 during operation is permanently greater by a factor of 1.5 than the amplitude of the phase-to-phase voltage of the first AC voltage U_AC1 on the AC side of the inverter 16.

If the transformer 18 has an AC/AC transformation ratio of 1 and lossless transmission is assumed, the amplitude of the second AC voltage U_AC2 at the rectifier 20 is the same as the amplitude of the first AC voltage U_AC1 of the inverter 16. It is also possible, for example, to select the AC/AC transformation ratio of the transformer 18 to be U_AC1/U_AC2=1.5 and the DC/AC transformation ratio of the inverter 16 to be U_PV/U_AC1=1.5. Then the amplitudes of U_AC1 and U_AC2 are no longer equal, but the ratio of I_PV and P_PV to I_AC2 and P_AC2 is similar to the ratio of I_PV and P_PV to I_AC1 and P_AC1 shown in FIG. 6.

Figure 7:
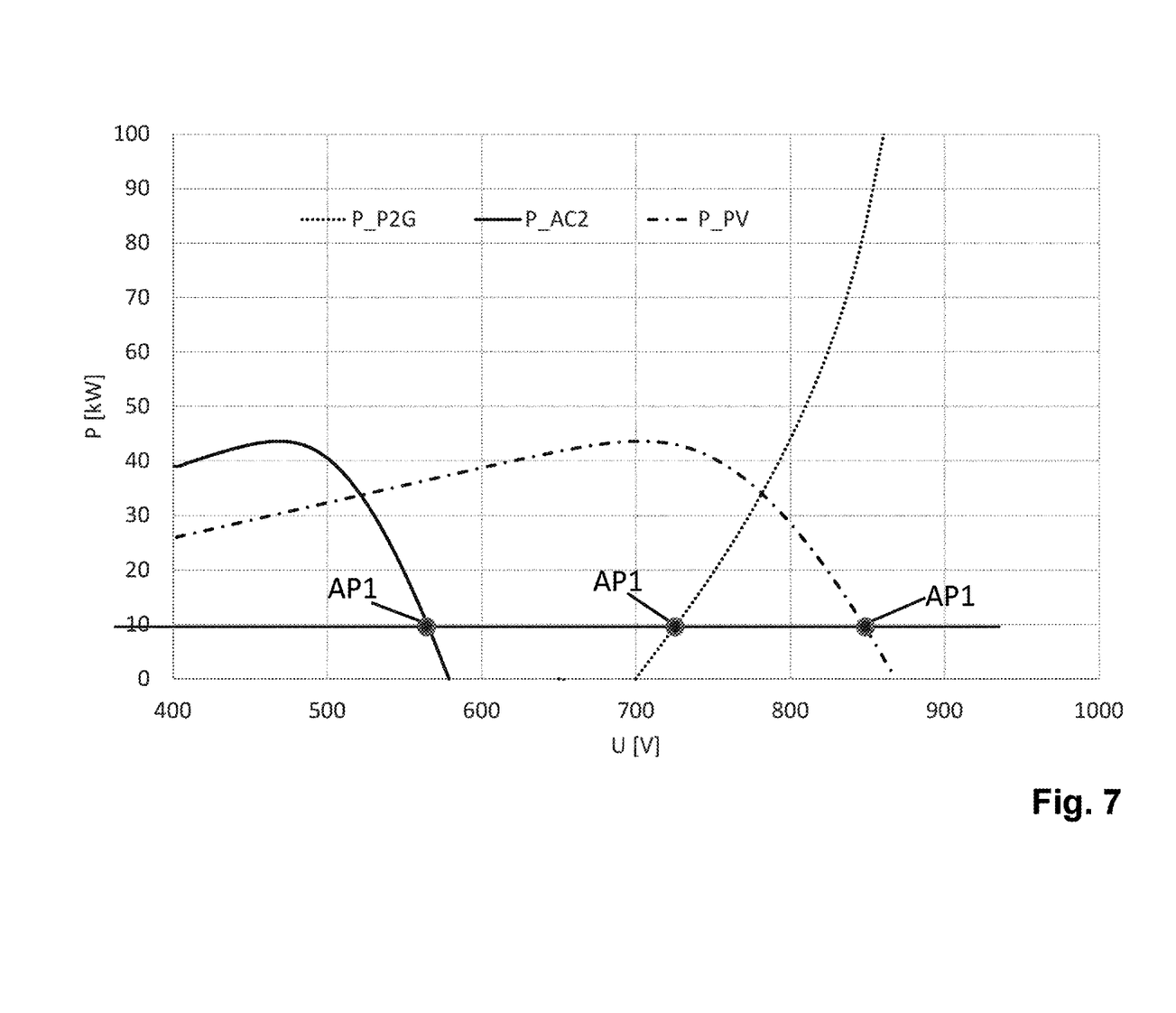

FIG. 7 shows a portion of the PV characteristic curve P_PV of the PV generator 12, of the corresponding PV characteristic curve P_AC2 on the AC side of the active rectifier 20, and of the electrolysis characteristic curve P_P2G on the DC side of the active rectifier 20. The portions shown here relate to the aforementioned characteristic curves with low irradiation on the PV generator 12, for example, in the morning. The PV characteristic curve shown in a dash-dotted line represents the PV power P_PV over the first DC voltage U_PV of the PV generator 12. The solid-line characteristic curve represents the second AC power P_AC2 over the second AC voltage U_AC2 on the AC side of the rectifier 20. The dotted characteristic curve represents the electrolysis power P_P2G over the second DC voltage U_P2G. The illustrated electrolysis characteristic curve of the electrolysis power P_P2G shows the power consumed in the electrolysis in relation to the second DC voltage U_P2G applied to the DC terminals of the rectifier 20.

In FIG. 7, points AP1 are marked on the characteristic curves shown. These operating points AP1 are used for a start phase of the energy conversion system 100 at low irradiation, i.e. at very low power compared to the nominal power of the electrolyzer (here: 10 kW at approx. 1000 kW nominal power; see FIG. 8). At this operating point AP1, the PV generator 12 has power available that is sufficient to cover losses and to provide the magnetizing current of the transformer 18, to pre-charge the electrolyzer 14, and to supply the auxiliary units of the auxiliary supply 22. The power available, given a voltage of 850 V applied to the PV generator 12, is 10 kW in the example shown. On the AC side of the inverter 16, the first AC voltage at operating point AP1 is U_AC 1=566 V, due to the selected DC/AC transformation ratio of 1.5. For the second AC voltage U_AC2, a selected AC/AC transformation ratio of 1 also results in U_AC2=566 V. In the initial state of the energy conversion system, i.e. after pre-charging the components, a standby voltage of approx. 566 V is also present at the electrolyzer 14 as long as the AC/DC transformation ratio of the rectifier 20 is equal to or close to one.

In the start phase, the rectifier 20 begins pre-charging the electrolyzer 14 to U_P2G=720 V by changing the AC/DC transformation ratio such that the second DC voltage U_P2G is increased. As soon as the starting voltage of the electrolyzer 20 of U_P2G=700 V is reached, the second AC voltage U_AC2, and thus also the PV voltage U_PV, decreases at the same time. As a result, both the PV power P_PV, or the coupled second AC power P_AC2, and also the electrolysis power P_P2G increase. A power equilibrium is established which, in FIG. 7, results in a power flow of around 10 kW from the PV generator 12 to the electrolyzer 14 for a given AC/DC transformation ratio. If the available power drops to e.g. below 2 kW during the start phase, the energy conversion system 100 returns to the idle state. It would also be possible to provide an energy store to buffer power for the start phase, e.g. for the auxiliary units of the auxiliary supply, losses, or the like.

Figure 8:
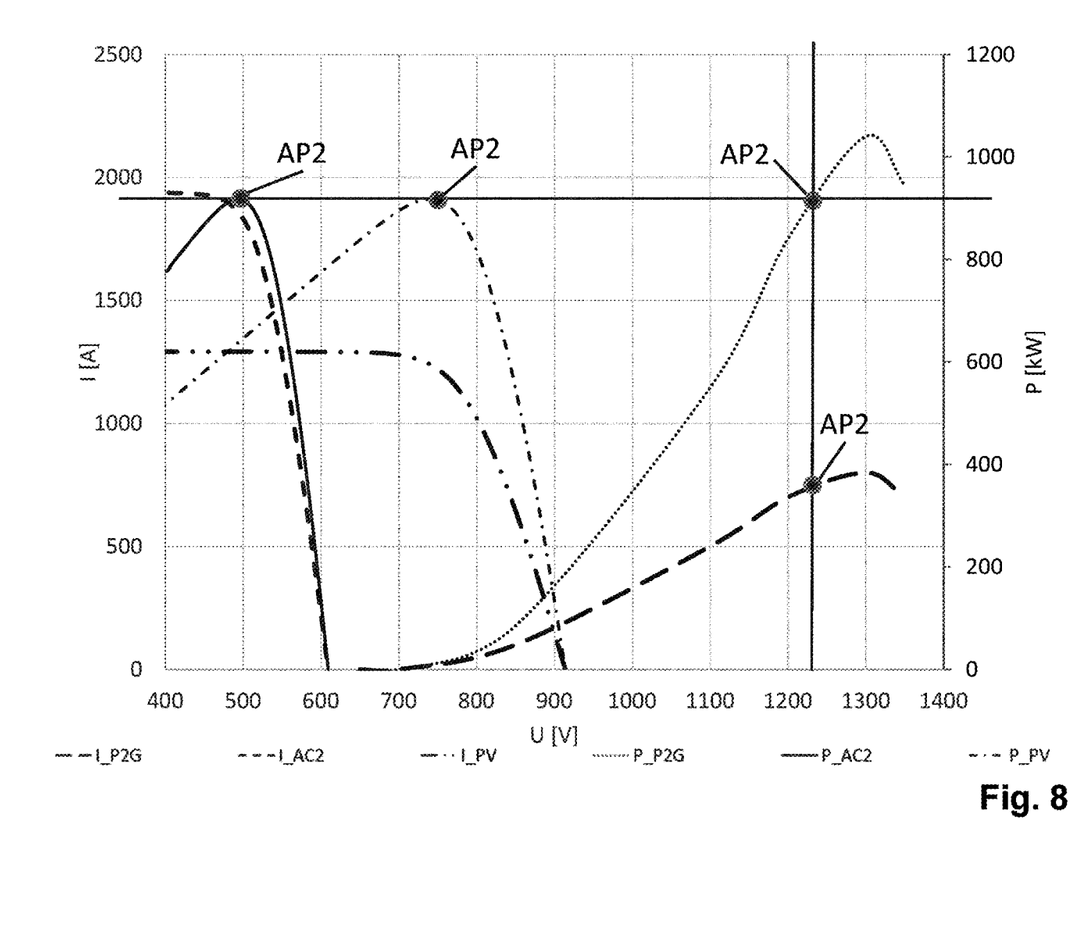
Figure 9:
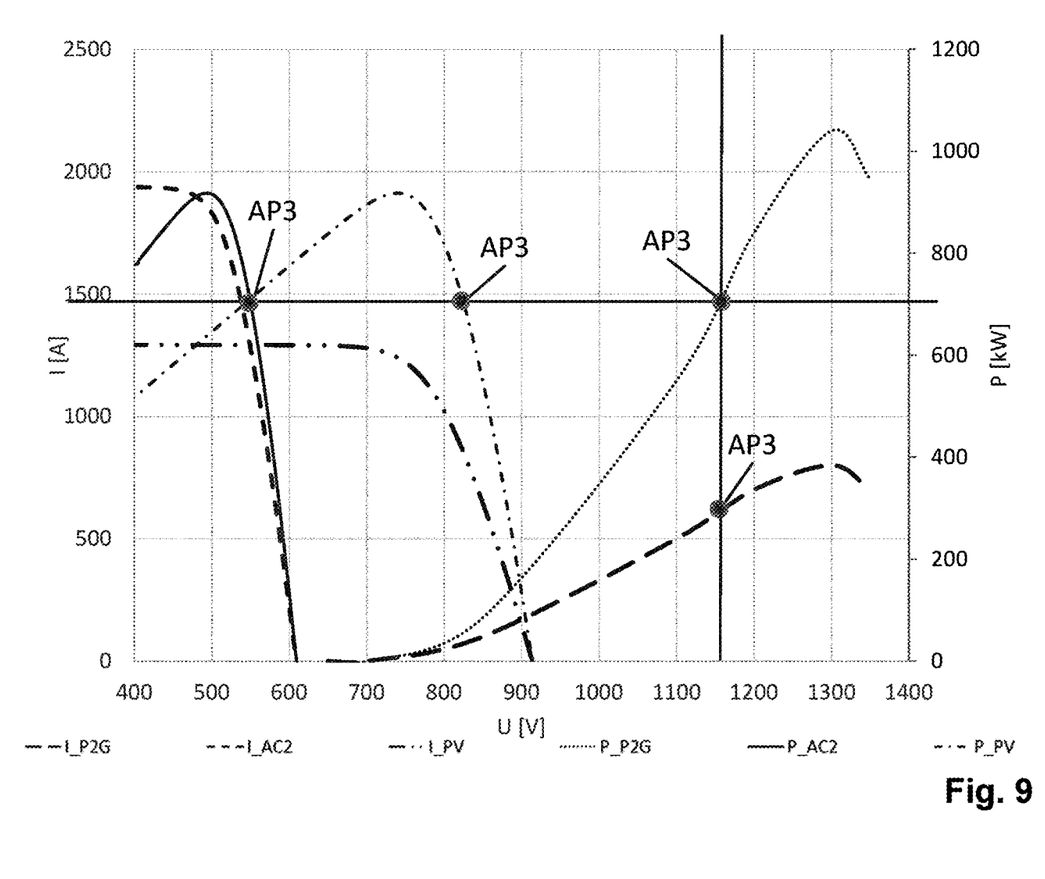

FIGS. 8 and 9 each show the PV characteristic curves I_PV, P_PV of the PV generator 12, the PV characteristic curves I_AC2, P_AC2 coupled to it on the AC side of the active rectifier 20, and the electrolysis characteristic curves I_P2G, P_P2G of the electrolyzer 14 on the DC side of the active rectifier 20. The irradiation on the PV generator 12 is higher here than for the characteristic curves shown in FIG. 7.

In FIGS. 8 and 9, the PV characteristic curve shown with a dash-dotted line represents the PV power P_PV over the first DC voltage U_PV at the PV generator 12. The PV characteristic curve shown with a dash-double-dotted line represents the PV current I_PV over the PV voltage U_PV at the PV generator 12. The PV characteristic curve shown as a solid line represents the second AC power P_AC2 over the second AC voltage U_AC2 on the AC side of rectifier 20. The narrow-dashed characteristic curve represents the second AC current I_AC2 over the second AC voltage U_AC2. The sum current I_AC2 is plotted in all three conductors for phase-to-phase voltages U_AC2, which is higher than the first DC current I_PV for the same power level, since the voltage U_AC2 is lower than the voltage U_PV, while the power levels P_DC and P_AC2 are identical.

The dotted characteristic curve represents the electrolysis power P_P2G over the electrolysis voltage U_P2G. The broad-dashed characteristic curve represents the electrolysis current I_P2G over the electrolysis voltage U_P2G. The illustrated electrolysis characteristic curve of the electrolysis power P_P2G shows the power consumed in the electrolysis in relation to the electrolysis voltage U_P2G applied to the DC terminals of the rectifier 20. The illustrated electrolysis characteristic curve of the electrolysis current I_P2G shows the current flowing into the electrolyzer in relation to the electrolysis voltage U_P2G applied to the DC terminals of the rectifier 20.

FIG. 8 shows the operation of the energy conversion system 100 at an operating point AP2 with maximum power P_MPP. The system is operated with a power that corresponds to the maximum power point (MPP) of the PV generator 12. The corresponding operating points on the characteristic curves for P_P2G, P_PV and P_AC2 are each labeled AP2.

To reach the operating point AP2, the active rectifier 20 reduces the second AC voltage U_AC2 and simultaneously increases the electrolysis voltage U_P2G. As a result, the PV voltage U_PV also decreases, so that the PV power P_PV increases until a new power equilibrium is established between the generated PV power P_PV and the consumed electrolysis power P_P2G for a given transformation ratio of the device 10. The AC/DC transformation ratio can be varied further until the maximum power of the PV generator 12 is reached. This then corresponds to the operating point AP2. At this operating point AP2, U_AC2=U_AC1=500 V and I_P2G=750 A (AP2 on I_P2G). At PV generator 12, this corresponds to U_PV=750 V (AP2 on P_PV). When the operating point AP2 is reached, the MPP tracking starts and the active rectifier 20 increases or decreases the AC/DC transformation ratio stepwise. Here, the active rectifier 20 indirectly reduces or increases the voltage difference between the operating points on the PV characteristic curve and on the electrolysis characteristic curve stepwise, wherein a new power equilibrium is established after each change in the AC/DC transformation ratio. The resulting power flow can be detected and maximized by means of suitable controlling so that the PV generator is operated at the MPP or at least around the MPP.

FIG. 9 shows the operation of the energy conversion system 100 at an operating point AP3. In this operating mode, for example, what is aimed at may be to produce gas as constantly as possible, i.e. uniformly, e.g. hydrogen production at a constant production rate, or a power limitation may be required, e.g. to a nominal power of the electrolyzer 14, if this is less than the available PV power P_PV. In such a case, e.g. an electrolysis management system of the electrolyzer 14 can transmit a current setpoint value for the electrolysis current I_P2G or a power setpoint value for the electrolysis power P_P2G to the active rectifier 20.

To reach the operating point AP3 beginning from the starting state (see FIG. 7), the active rectifier 20 increases the spread between the electrolysis voltage U_P2G and the second AC voltage U_AC2 until the desired setpoint value for the second electrolysis current I_P2G or until the desired setpoint value for the electrolysis power P_P2G is reached. This then corresponds to the operating point AP3. If the electrolysis current I_P2G at this operating point AP3, for a given distance between U_PV and U_P2G, becomes smaller than the current setpoint value, e.g. due to decreasing irradiation on the PV generator 12, then the active rectifier 20 increases the distance between U_PV and U_P2G by changing the AC-DC transformation ratio, so that the PV voltage U_PV decreases and thus the PV power increases along the PV characteristic curve until a new equilibrium between generated PV power P_PV and consumed electrolysis power P_P2G is established for a given transformation ratio of the device 10. The same applies if the power output P_P2G is below the power setpoint. The desired operating point AP3 is held here as long as the power setpoint or the power required at the current setpoint is below the currently maximum possible power of the PV generator 12.

The controlling described above, for example, with reference to FIGS. 7-9, can, as described, be carried out by the active rectifier 20, for example, by a controller in the active rectifier 20, and alternatively or additionally by a control unit of the device 10.

What is claimed is:

1. A device for converting electrical power between a photovoltaic (PV) generator and an electrolyzer, wherein the device has a first side configured to connect to the PV generator and a second side configured to connect to the electrolyzer, the device comprising:
an inverter arranged between the first side and a transformer, and an active rectifier arranged between the transformer and the second side, wherein an AC side of the active rectifier and an AC side of the inverter are connected to one another via the transformer, wherein the inverter is configured to convert a first DC voltage on a DC side of the inverter associated with the first side of the device into a first AC voltage on the AC side of the inverter associated with the transformer, wherein the active rectifier is configured to convert a second AC voltage on the AC side of the active rectifier associated with the transformer into a second DC voltage on a DC side of the active rectifier associated with the second side of the device, and wherein the device comprises a controller configured to influence a power flow between the first side of the device and the second side of the device from a PV generator when connected thereto at the first side thereof to the electrolyzer when connected thereto at the second side of the device by adjusting an AC/DC transformation ratio of the active rectifier between the second AC voltage and the second DC voltage.

2. The device according to claim 1, wherein the active rectifier comprises semiconductor switches and an adjustment of the AC/DC transformation ratio of the active rectifier is carried out by a suitable clocking of the semiconductor switches.

3. The device according to claim 1, wherein the first DC voltage on the DC side of the inverter and the second DC voltage on the DC side of the active rectifier depend on an AC/DC transformation ratio of the active rectifier.

4. The device according to claim 1, wherein the active rectifier is configured to act as a buck converter from its DC side to its AC side, wherein a bucking operation of the buck converter depends on an AC/DC transformation ratio of the active rectifier, and/or wherein the inverter is configured to act as a buck converter with a DC/AC transformation ratio from its DC side to its AC side.

5. The device according to claim 1, wherein the transformer is configured to convert the first AC voltage to the second AC voltage with an AC/AC transformation ratio and provides a galvanic separation between the first side of the device and the second side of the device.

6. The device according to claim 4, wherein the device is configured to influence a power flow between the first side and the second side by adjusting the DC/AC transformation ratio of the inverter and/or an AC/AC transformation ratio of the transformer.

7. The device according to claim 1, wherein the inverter is configured to perform a function of the active rectifier and vice versa, wherein the inverter and the active rectifier have the same or similar housing and the same or similar power electronics circuit.

8. The device according to claim 1, wherein the inverter is connected to the transformer via an AC grid and at least one further inverter is connected to the AC grid, wherein the further inverter is connected on a DC side thereof to a further PV generator or an electrical energy store.

9. A method for converting electrical power between a photovoltaic (PV) generator and an electrolyzer, comprising:

converting a PV power generated by the PV generator at a first DC voltage into an AC power at a first AC voltage using an inverter, transforming the AC power through a transformer into an AC power with a second AC voltage, converting the AC power with the second AC voltage into a DC power using an active rectifier, and feeding the DC power into the electrolyzer at a second DC voltage, wherein a power flow between the PV generator and the electrolyzer is influenced by the active rectifier via an AC/DC transformation ratio between the second AC voltage and the second DC voltage that is set by the active rectifier.

10. The method according to claim 9, wherein the first DC voltage is present on a DC side of the inverter that couples to the PV generator, the first AC voltage is present on an AC side of the inverter that couples to the transformer, the second AC voltage is present on an AC side of the active rectifier, and the second DC voltage is present on a DC side of the active rectifier that couples to the electrolyzer, wherein the first DC voltage and the second DC voltage depend on the set AC/DC transformation ratio of the active rectifier.

11. The method according to claim 9, wherein, starting from a first DC voltage, which corresponds to an open-circuit voltage of the PV generator, and a second DC voltage, which corresponds to a standby voltage of the electrolyzer, the power flow is increased by setting the AC/DC transformation ratio of the active rectifier such that the first DC voltage is reduced and the second DC voltage is increased, wherein the PV power increases in the direction of an maximum power point (MPP) power and the DC power absorbed by the electrolyzer increases in the direction of a nominal power.

12. The method according to claim 9, wherein the AC/DC transformation ratio of the active rectifier is set to an initial state such that the first DC voltage corresponds to an open-circuit voltage of the PV generator and the second DC voltage corresponds to a standby voltage of the electrolyzer.

13. The method according to claim 12, wherein a ratio of the first DC voltage to the second DC voltage in the initial state corresponds to a product of an AC/AC transformation ratio of the transformer and a fixed DC/AC transformation ratio of the inverter.

14. The method according to claim 13, wherein the DC/AC transformation ratio of the inverter is set to a value between 1 and 2.

15. The method according to claim 12, wherein an AC/AC transformation ratio of the transformer is changed stepwise to reach an initial state in which the DC/AC transformation ratio of the inverter has a value determined therefor and the AC/DC transformation ratio of the active rectifier is substantially one.

16. The method according to claim 9, wherein an AC/DC transformation ratio of the active rectifier is adjusted by varying a duty cycle of the active rectifier based on a detected power of the power flow from the PV generator into the electrolyzer.

17. The method according to claim 9, wherein an AC/DC transformation ratio of the active rectifier is changed stepwise such that a PV power output of the PV generator is increased stepwise, wherein the power output is increased from an initial state or from zero to a maximum power of the PV generator.

18. The method according to claim 17, wherein the AC/DC transformation ratio of the active rectifier is repeatedly changed and a change in the power flow caused thereby is observed, wherein the AC/DC transformation ratio of the active rectifier is adjusted after each change in the AC/DC transformation ratio of the active rectifier such that the PV power of the PV generator approaches a maximum power point (MPP) power.

19. The method according to claim 9, comprising a further inverter connected on a DC side thereof to an electrical energy store and on an AC side thereof to the transformer, wherein the further inverter is configured to exchange an adjustable DC storage power with the electrical energy store.

20. An energy conversion system comprising a photovoltaic (PV) generator, an electrolyzer, and a device for converting electrical power between the PV generator and the electrolyzer, wherein the device has a first side configured to connect to the PV generator and a second side configured to connect to the electrolyzer, the device comprising:
  an inverter arranged between the first side and a transformer, and an active rectifier arranged between the transformer and the second side, wherein an AC side of the active rectifier and an AC side of the inverter are connected to one another via the transformer,
  wherein the inverter is configured to convert a first DC voltage on a DC side of the inverter associated with the first side of the device into a first AC voltage on the AC side of the inverter associated with the transformer,
  wherein the active rectifier is configured to convert a second AC voltage on the AC side of the active rectifier associated with the transformer into a second DC voltage on a DC side of the active rectifier associated with the second side of the device, and
  wherein the device comprises a controller configured to influence a power flow between the first side of the device and the second side of the device from a PV generator when connected thereto at the first side thereof to an electrolyzer when connected thereto at the second side of the device by adjusting an AC/DC transformation ratio of the active rectifier between the second AC voltage and the second DC voltage.

* * * * *